United States Patent [19]

Hunsucker

[11] 4,431,699
[45] Feb. 14, 1984

[54] AMINOPLAST RESIN CROSS-LINKING AGENTS AND NITROALKANOL USED TO TREAT CELLULOSE

[75] Inventor: Jerry H. Hunsucker, Terre Haute, Ind.

[73] Assignee: Angus Chemical Company, Northbrook, Ill.

[21] Appl. No.: 336,732

[22] Filed: Jan. 4, 1982

[51] Int. Cl.$^3$ .................. B32B 7/00; D03D 3/00; D03D 15/00; C08G 12/12
[52] U.S. Cl. .................. 428/270; 252/8.8; 8/127.6; 8/182; 8/183; 8/185; 8/187; 427/393.2; 428/274; 428/290; 524/14; 528/262; 528/367; 528/369
[58] Field of Search ............ 8/127.6, 182, 183, 185, 8/187; 106/163 R; 252/8.8; 427/393.2; 524/14; 528/262, 367, 369; 428/270, 274, 290

[56] References Cited

U.S. PATENT DOCUMENTS

| | | | |
|---|---|---|---|
| 2,817,617 | 12/1957 | Rogers | 427/393 X |
| 2,957,746 | 10/1960 | Buck et al. | 8/185 X |
| 3,917,558 | 11/1975 | Gardikes et al. | 524/14 X |
| 4,219,631 | 8/1980 | Hunsucker et al. | 525/398 |

FOREIGN PATENT DOCUMENTS 1002668 8/1965 United Kingdom .

*Primary Examiner*—Michael R. Lusignan
*Attorney, Agent, or Firm*—Leydig, Voit, Osann, Mayer & Holt, Ltd.

[57] ABSTRACT

A composition adapted to treating textiles and non-woven cellulosic products comprising a mixture of a cross-linking agent and a nitroalkanol. A method of reducing the residual formaldehyde content of the wrinkle-resistant fabric and a wrinkle-resistant fabric per se comprising the use of the claimed composition.

18 Claims, No Drawings

AMINOPLAST RESIN CROSS-LINKING AGENTS AND NITROALKANOL USED TO TREAT CELLULOSE

CROSS-REFERENCE TO RELATED APPLICATIONS

This application is related to of copending application Ser. No. 170,437 filed July 21, 1980, which was a continuation-in-part of application Ser. No. 063,221 filed Aug. 3, 1979, now abandoned.

BACKGROUND OF THE INVENTION

This invention relates to a method for reducing residual formaldehyde in articles of manufacture. In a particular aspect this invention relates to a method of reducing residual formaldehyde in articles manufactured using resins containing terminal methylol groups.

Formaldehyde is a very useful raw material for the manufacture of plastics and resins by condensation with such other raw materials as phenols, urea, furfuryl alcohol, melamines, methylol-containing acrylics and the like. These plastics and resins find a multitude of uses such as in the manufacture of wrinkle-resistant fabrics, non-woven cellulosic articles, particle board, in the preparation of foundry cores and resins, protective coatings, molded products, adhesives, etc.

The importance of dimensional stability, such as wrinkle resistance and durable press properties in textile fabrics and non-woven cellulose products are well established and are of great importance and economic value to the textile industry. The majority of textile articles, both wearing apparel and household articles, available in the marketplace exhibit these properties to some beneficial degree. Although many synthetic fibers inherently possess resiliency and wrinkle resistance, fabrics containing cellulose fibers must be chemically treated to acquire these important properties needed for the modern textile market.

In addition to wrinkle resistance and permanent press properties, it is highly desirable that non-woven cellulosic products display good wet strength characteristics. Yet most paper goods are especially deficient in wet strength unless they are treated.

The principal chemical treatments which produce wrinkle resistance and durable press properties in cellulose-containing textiles and non-woven products are those in which the cellulose molecules are crosslinked, generally by reaction of a di- or poly-functional agent with the cellulose. Many of the agents employed by the textile processing industry to produce durable press properties in cellulosic fabrics are N-methylol adducts formed by reacting nitrogen-containing compounds with formaldehyde. To enhance the reactions between the cellulose and these adducts many compounds or catalysts may be employed.

At present, urea-formaldehyde and urea-glyoxal resins (i.e. the ethylene ureas) are used in large volume. However, glyoxal is a high-cost raw material and it would be advantageous to employ the more economical urea-formaldehyde resin. Other products commonly used to impart wrinkle resistance include cellulose cross-linking agents such as carbamates, triazones, melamines and methylol melamines.

These products, that is, those based on resins having terminal methylol groups, all present another problem, namely, they result in residual free aldehyde, e.g. formaldehyde, on the cloth or other object which is objectionable because it tends to pollute the environment. Similarly, many other industries employing formaldehyde-based resins are faced with occupational health problems involving formaldehyde.

SUMMARY OF THE INVENTION

It is an object of this invention to provide an improved method for treating cellulosic and other fibers.

It is another object of this invention to provide a urea-aldehyde resin mixture having particular utility for treating textiles and non-woven cellulose products.

It is yet another object of this invention to provide a method for reducing the amount of residual free aldehyde on cellulosic products which have been treated with an aldehyde-based crosslinking agent such as a urea-aldehyde resin or other aldehyde-based resin or monomer.

It is still yet another object of this invention to provide a method of improving the hand of textiles.

It is a fifth object of this invention to provide a method for reducing residual formaldehyde in articles manufactured using resins containing terminal methylol groups.

Other objects of this invention will be apparent to those skilled in the art from the description herein.

It is the discovery of this invention to provide a composition comprising a mixture of a crosslinking agent, such as a curable urea-aldehyde or other aldehyde-based resin or crosslinking agent, with a nitroalkanol of the formula

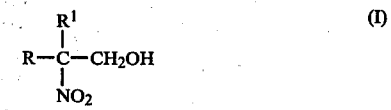

where R and R$^1$ are hydrogen, methyl, ethyl or hydroxymethyl and can be the same or different or of the formula

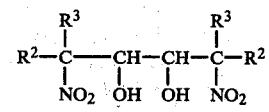

where R$^2$ can be hydrogen, methyl or ethyl and R$^3$ can be hydrogen or methyl; R$^2$ and R$^3$ can be the same or different.

Preferably, but not necessarily, the mixture is provided as an aqueous dispersion or solution. It is also contemplated that the mixture can be prepared by the user immediately prior to use.

It is an embodiment of the present invention that the residual free aldehyde in an aldehyde-containing resin, e.g. a methylol-terminated resin such as urea-formaldehyde or urea-glyoxal, or an aldehyde-based crosslinking agent or a product containing same can be significantly reduced by employing a nitroalkanol with the resin, e.g. a urea-aldehyde resin, or crosslinking agent. The term "aldehyde-based" is intended to mean that the resin or crosslinking agent has an aldehyde, usually formaldehyde, as one of the reactants in the manufacture thereof.

It is not the intent to limit the invention to textile treatment. Rather it is contemplated that nitroalkanols are useful with all aldehyde-based or methylol terminated resins, monomers, crosslinking agents and processes and products employing them, such as phenol-formaldehyde resins, etc.

It is another embodiment of this invention to provide a method for improving the hand of wrinkle resistant textiles and non-woven fabrics by treating them with a nitroalkanol of the foregoing formula at a pH between about 2.0 and 7.0.

DETAILED DISCUSSION

The composition of this invention is a mixture of a resin, monomer or other crosslinking agent, generally but not necessarily adapted to conferring wrinkle resistance and durable press properties to textiles, such as a curable urea-aldehyde or other aldehyde-containing resin or monomer thereof, or methylol terminated, many of which are known, and a nitroalkanol. The term "curable" is intended to mean that the crosslinking agent, monomer or resin is incompletely polymerized and is capable of further reaction with crosslinking agents and the like. Hereinafter, the term "crosslinking agent" is intended to include aldehyde-based or methylol terminated monomers, resins and binders. Such resins include but are not limited to those resulting from the reaction of a stoichiometric excess of formaldehyde with phenol, urea and/or furfuryl alcohol. Included are resins such as urea-formaldehyde, phenol and substituted phenol formaldehyde, melamines, methylol-containing acrylics, furfuryl alcohol-formaldehyde, urea furfuryl alcohol-formaldehyde, phenol/furfuryl alcohol-formaldehyde, phenol/urea/furfuryl alcohol-formaldehyde, urea/phenol-formaldehyde as well as mixtures of these resins.

An example of a typical resin suitable for use in the practice of this invention is a urea-formaldehyde resin or a urea-glyoxal resin (i.e. ethylene urea), preferably urea-formaldehyde. Substituted ureas may also be used in forming the resin. Instead of resins, many aldehyde-based monomeric substances are used as crosslinking agents for the molecules of the textile. Commonly used ones include but are not limited to carbamates such as 2-methylethylcarbamate; modified melamines, such as methylated methylol melamines; the ethylene ureas; and triazones, such as disclosed in U.S. Pat. No. 2,917,411. More particularly, the following compounds, all of which are prepared using an aldehyde, namely formaldehyde, as a raw material, are commonly used: dimethylolurea; dimethoxymethylurea; methoxymethylmelamine (trimethoxymethyl to hexamethoxy); dimethylolalkanediol diurethane; dimethylolethylene urea; dimethyloldihydroxyethylene urea; dimethylolpropylene urea; dimethylol-4-methoxy-5,5-dimethylpropylene urea; dimethylol-5-hydroxypropylene urea; dimethylolhexahydrotriazinones; dimethoxymethylureone; tetramethylolacetylene diurea; dimethylol carbamates of the formula

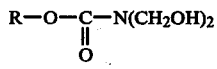

where R is alkyl, hydroxyalkyl, or alkoxyalkyl; methylolacrylamide dimethylolalkanediols.

The process of this invention for greatly reducing or eliminating free formaldehyde, as well as other embodiments, can be used in processes using the above crosslinking agents. These resins and crosslinking agents are often used at a pH below about 7.0 and when nitroalkanols are present, the pH must be below 7.0, e.g. 3 to 7, preferably about 4.0. Such an acidic pH can be provided by any suitable means known in the art. Commonly used methods include employing acidic salts such as zinc salts, e.g. the chloride, nitrate, sulfate; magnesium salts, such as the chloride. Also amine salts, especially the chlorides. The control of pH in using these resins and crosslinking agents is well known in the art and any art-recognized method is suitable for the practice of this invention.

The amount of nitroalkanol used is not critical but can be optimized for each resin, depending on the number of unreacted methylol groups in the resin. For example, when urea-formaldehyde is the resin, the amount used is generally in the range of from 0.25 to 3.0 moles per mole of urea used in preparing the resin. For example, urea-formaldehyde resin generally is prepared, as is known in the art, in a mole ratio of about 1 to 1–5 respectively. If the nitroalkanol is 2-nitro-2-methyl-1-propanol (NMP), it is used in an amount of from about 115 to 350 g per 100 g of resin when the urea-formaldehyde is in a ratio of 1:1. When the ratio is 1:5 respectively, the NMP used is in the range of about 50 to 150 g per 100 g of resin. When other nitroalkanols are used, the amounts are proportional to the NMP. When the resin is a urea-glyoxal type, comparable amounts of nitroalkanol are used.

When other durable press resins or aldehyde-containing crosslinking agents are used, the amount of nitroalkanol to be used is in the general range of 18 to 142 parts per 100 parts by weight of resin. However, as previously mentioned, the range is not critical.

It is another embodiment of this invention to react the urea-formaldehyde resin with up to 1.5 moles of glyoxal per mole of urea before mixing with the nitroalkanol. It is also contemplated that melamine can be employed as a crosslinking agent in place of the glyoxal.

The nitroalkanols corresponding to formula I which are useful in the practice are commercially available and include, but are not limited to tris(hydroxymethyl)nitromethane; 2-nitro-2-methyl-1,3-propanediol; 2-nitro-2-ethyl-1,3-propanediol; 2-nitro-1-butanol and, preferably, 2-nitro-2-methyl-1-propanol. Compounds corresponding to formula II include 2,5-dinitrohexane-3,4-diol; 3,6-dinitrooctan-4,5-diol; 2,5-dimethyl-2,5-dinitro-3,4-hexanediol; 1,4-dinitro-2,3-butanediol. These compounds are not commercially available but may be prepared by the method of F. I. Carroll, J. Org. Chem. 31, 366 (1966) which is incorporated herein by reference. Mixtures of these nitroalkanols can also be used. It is understood that the invention is not limited to these nitroalkanols. Other nitroalkanols are known in the art and are regarded as being the obvious equivalents of the foregoing.

The urea-aldehyde resins and other crosslinking agents useful in the practice of this invention are known in the art and are commercially available for the preparation of wrinkle-proof textiles and adhesives for non-woven cellulosic products. The resins and other crosslinking agents are incompletely polymerized so that when impregnated, e.g. as an aqueous dispersion, onto the textile, further polymerization, or curing, takes place on heating.

Urea-formaldehyde resins used for this purpose are generally prepared by reacting the formaldehyde and urea under alkaline conditions, e.g. at a pH of about 7–11, preferably 8.0–10.5 and particularly at about 10.0–10.5. The pH can be provided by any alkaline reagent many of which are known, viz. inorganic carbonates, bicarbonates, oxides or hydroxides, including those of sodium, potassium and lithium. Sodium hydroxide is preferred.

The urea-formaldehyde resins used in the preparation of wrinkle resistant fabrics, the treatment of which forms one embodiment of this invention, are usually prepared at a mole ratio of from 4–6 moles of formaldehyde per mole urea. Such resins are generally known to those skilled in the art as uron resins as distinguished from those formed at a mole ratio of up to 3:1. Analysis by measurement of nuclear magnetic resonance of one sample (without nitroalkanol) of the composition of this invention indicated the following:

Dimethyloluron: 39.2%
Dimethoxyuron: 22.1%
Monomethyloluron: 18.4%
Trimethylolurea: 9.6%
Sym. Dimethylolurea: 5.5%
Monomethylolurea: 5.3%

Urea-formaldehyde resins used in the manufacture of particle board, however, are usually prepared at a mole ratio of 1.1:1, of formaldehyde to urea.

The reaction of formaldehyde and urea is preferably, but not necessarily, carried out under alkaline conditions at elevated temperatures of from about 40° C. to reflux temperature at ambient pressure, preferably at reflux temperature. When the reaction is complete, the reaction mixture is cooled to about 55°–65° C. and the pH is adjusted to about 5.0–7.0. The pH adjustment can be effected with any water-soluble mineral or organic acid. Generally a dilute acid such as dilute hydrochloric, phosphoric, sulfuric, p-toluene sulfonic, etc. will be used. The heating period is then continued at 55°–60° C. about one more hour to ensure complete reaction. The reaction product is then allowed to cool and if desired can be diluted to about 25–45% solids, which hastens the cooling process. It is understood that the preparation of the resin is not a part of this invention.

The urea-glyoxal resins useful in the practice of this invention are known in the art. They are commercially available from e.g., Sun Chemical Corporation, Chester, S.C., under the trademark "Permafresh". Any of the urea-glyoxal resins may be used in the practice of this invention.

A 25% dispersion or solution of the resin mixture is preferred in the art for treating the textile or other non-woven, cellulosic object. Preferably it is used with a catalyst, e.g. magnesium chloride or zinc nitrate. It is convenient to prepare the catalyst as a 25% aqueous solution and mix one part of the catalyst solution with four parts of the 25% resin solution. The textile or other non-woven, cellulosic object is then saturated with the mixture, pressed to about a 60% wet pickup, then heated at, e.g. about 350° F. to cure the resin.

It is contemplated that the products and objects which will benefit from the wrinkle resistance conferred by the resin of the present invention will include but will not be limited to those made from natural fibers, principally wool and cellulose, both woven and non-woven. Of the woven fibers, cotton fabrics are the ones which are expected to receive the most benefit. Non-woven fabrics are usually made from cellulose fibers, e.g. wood fibers, and are used extensively. While much of it goes to disposable items where wrinkle resistance may not be of great importance, still the market for durables is increasing especially in clothing interliners, bedding, carpets, draperies, etc., where wrinkle resistance is important. The term fabric as used herein is intended to encompass such cellulose containing product. Actually, it is contemplated that any cellulose containing product, including but not limited to textiles, paper goods, particle board, laminated plywood and the like, which is to be treated with a crosslinking agent, e.g. a urea-aldehyde resin, will benefit from treatment with a nitroalkanol.

Important advantages accrue from the use of nitroalkanols in the treatment of textiles and non-woven cellulosic products with urea-aldehyde resins. The treated fabrics have much improved "hand" when the treatment is conducted in the presence of nitroalkanols, and the residual aldehyde is much reduced, thereby improving the environment. Furthermore, the present invention makes it possible to use inexpensive urea-formaldehyde (uron) resins in the wrinkle resistant process yet produce results comaprable to or better than the high cost resins such as urea-glyoxal resins. Also, the nitroalkanols effect a quicker cure of the resins at the temperatures customarily used, or at lower temperatures, they effect a better cure giving a better recovery angle. Thus they tend to conserve energy. Other advantages will also be apparent to those skilled in the art.

It is another embodiment of this invention to provide an improved process for the manufacture of artificial board and to provide an improved artificial board having reduced residual formaldehyde. Such boards are known by various names, depending on the materials used in their manufacture, e.g. particle board, fiber board, flake board, chipboard, etc. For simplicity, such artificial boards will be collectively referred to herein as particle board, it being understood that the term is intended to mean any artificial board manufactured from a cellulosic material and a methylol-containing resin. Simply stated, such a board is manufactured by mixing the cellulosic material, e.g. wood chips, flakes, particles, etc. with a thermosetting resin, delivering the mixture to a press where it is formed to the predetermined dimensions of the board, then heating the mixture to set the resin, thereby forming the particle board. Many such processes employ a formaldehyde-derived resin containing methylol groups which gives rise to residual formaldehyde in the particle board. This residual formaldehyde is objectionable for reasons of health. According to the present invention, there is incorporated in the mixture of cellulosic material and resin a nitroalkanol of formula I or II in an amount of from about 2% to about 15% based on the amount of resin. The nitroalkanol is effective in reducing the amount of residual formaldehyde in the board, provided that an acidic catalyst is used for the resin, as is usually the case. Such acidic catalysts are well known in the art and any of the known catalysts can be used with the nitroalkanols.

The invention will be better understood with reference to the following examples. It is understood that the examples are intended for illustration only and it is not intended that the invention be limited thereby.

EXAMPLE 1

Formaldehyde, 37% solution, 324 g (4 moles) and urea, 60 g (1 mole) were charged to a reaction vessel equipped with a concenser and an agitator. The pH was adjusted to 10.8 using 50% NaOH. The mixture was heated to 60° C. for five hours thereby forming a solution of a conventional urea-formaldehyde prepolymer.

The mixture was divided in two parts of 192 g each. One part was set aside and designated Solution A. To the other part, Solution B, was added 76.2 g of a 65% aqueous solution of 2-nitro-2-methyl-1-propanol (49.53 g dry basis, 0.48 moles) and 41.54 g of water to provide 45% total solids. This solution was further diluted to 25% solids by adding 44.5 parts of water per 55.5 parts of Solution B. To 100 parts of this solution was added 25 parts of magnesium chloride, 25% aqueous solution.

The wrinkle recovery was determined by Test Method 66-1968 of the American Association of Textile Colorists and Chemists. A piece of cotton cloth, unsized, was dipped into the resin solution, patted dry and stretched, then placed in an oven at 180° C. for ninety seconds. Ten specimens, 40 mm long and 15 mm wide, were cut from the cloth, five with their long dimension parallel to the warp and five with their long dimension parallel to the filling. The recovery angle was then determined as set forth in the test method on test specimens. The values were averaged and expressed as total recovery angle. Similar specimens were treated with the same resin solution (A) but without the addition of NMP. The results obtained are given in the table. The reduction in residual free formaldehyde was notable. The fabric treated with solution (B) had superior hand to that treated with solution (B) had superior hand to that treated with solution (A).

A sample of non-woven cellulosic material is treated with this resin. It has a high wet strength and good dimensional stability.

TABLE

| Example Number | Free Formaldehyde on Cloth | Recovery Angle, ° | Tensile Strength |
|---|---|---|---|
| 1A | 220 ppm | 328 | 23.9 |
| 1B | 115 ppm | 318 | 21.2 |
| 2A | 615 ppm | 281 | 23.1 |
| 2B | 215 ppm | 315 | 23.4 |
| 3A | 310 ppm | 262 | 30.6 |
| 3B | 110 ppm | 265 | 29.5 |
| 12A | 630 ppm | 320 | 20.4 |
| 12B | 480 ppm | 335 | 21.2 |

EXAMPLE 2

Formaldehyde, 37% aqueous solution, 910 g (11.2 moles) was delivered to a round bottom flask and the pH was adjusted to 7.5. Urea 120 g (2 moles) was added. A stirrer, condenser and thermometer attached. The reaction mixture was heated two hours at reflux while stirring. It was then allowed to cool and the solution, 45.16% solids, was divided into two parts, designated A and B, respectively.

Part A was diluted to about 25% by adding 44.5 parts of water to 55.5 parts of A. There was then added 25 parts of a 25% solution of magnesium chloride. This solution was used as a control to treat cloth as described in Example 1.

Part B, 465 g, was mixed with 152.4 parts of a 64.8% solution of NMP, giving a total of 617.4 g of a 50% solution. There was added 68.55 g of water to yield a 25% solution. To 55.5 parts of this solution there was added 44.5 parts of water to give a 25% solution and finally there was added 25 g of a 25% solution of magnesium chloride. This solution was then used to treat cloth. The results are given in the table. The cloth treated with the NMP and resin exhibited good hand—smooth and soft. The control cloth was smooth but stiff.

A sample of non-woven cellulosic material is treated with this resin. It has a high wet-strength and good dimensional stability.

EXAMPLE 3

The experiment of Example 2 was repeated in all essential details except that the urea and formaldehyde were reacted in a mole ratio of 1:1.6 respectively. The control cloth had poor hand—a stiff, rough feel. The cloth treated with NMP had good hand, smooth and pliable. The data are given in the table.

A sample of non-woven cellulosic material is treated with this resin. It has a high wet-strength and good dimensional stability.

EXAMPLE 4

The experiment of Example 1 is repeated in all essential details except that 2-nitro-1-butanol is substituted for NMP. Cotton cloth so treated shows a high recovery angle. A sample of non-woven cellulosic material so treated has a high wet-strength and good dimensional stability.

EXAMPLE 5

The experiment of Example 1 is repeated in all essential details except that tris(hydroxymethyl)nitromethane in equimolar quantities is substituted for NMP. Cotton cloth so treated shows a high recovery angle. A sample of non-woven cellulosic material so treated has a high wet-strength and good dimensional stability.

EXAMPLE 6

The experiment of Example 1 is repeated in all essential details except that 2-nitro-2-methyl-1,3-propanediol is substituted for NMP. Cotton cloth so treated shows a high recovery angle. A sample of non-woven cellulosic material so treated has a high wet-strength and good dimensional stability.

EXAMPLE 7

The experiment of Example 1 is repeated in all essential details except that 2-nitro-2-ethyl-1,3-propanediol is substituted for NMP. Cotton cloth so treated shows a high recovery angle. A sample of non-woven cellulosic material so treated has a high wet-strength and good dimensional stability.

EXAMPLE 8

The experiment of Example 1 is repeated in all essential details except that after the urea-formaldehyde resin is prepared, it is further heated at 50° C. for two hours with 0.5 mole of glyoxal per mole of urea. The pH is adjusted to 9.2 and 2-nitro-2-methyl-1-propanol (0.75 mole) is added. This mixture is used to treat cotton cloth and a sample of non-woven cellulosic material.

EXAMPLE 9

A. To 55.5 ml of a 45% aqueous solution of a urea-glyoxal resin was added 44.5 ml of water. The resin was obtained from Sun Chemical Company and was designated "Permafresh LF". To this solution there was added 22 g of a 65% solution of NMP and 25 ml of a 25% magnesium chloride solution giving a total of 150 ml. The pH was adjusted to about 5 with 1% sodium hydroxide solution. A sample of cloth was treated with this solution and tested for wrinkle recovery as described in Example 1. The results are given in the table.

B. The foregoing experiment was repeated in all essential details except that 25 ml of water was substituted for the NMP. The results are given in the table.

EXAMPLE 10

The experiment of Example 1 is repeated in all essential details except that Superez AVG, a carbamate resin manufactured by Proctor Chemical Company, is substituted for urea-formaldehyde. The fabric treated with NMP has superior hand to that which was not treated with NMP.

EXAMPLE 11

The experiment of Example 1 is repeated in all essential details except that Resimene 842, a methylated methylolmelamine made by Monsanto Chemical Company, is substituted for urea-formaldehyde. The fabric treated with NMP has superior hand to that which was not treated with NMP.

EXAMPLE 12

The experiment of Example 1 is repeated in all essential details except that Reactant 475, a triazone resin made by Quaker Chemical Company, is substituted for urea-formaldehyde. The fabric treated with NMP has superior hand to that which was not treated with NMP.

EXAMPLE 13

Two padding baths were prepared as follows:

|  | A | B |
| --- | --- | --- |
| Water | 31.54 lb | 32.13 lb |
| Crosslinking agent, 43% | 5.04 | 3.26 |
| NMP, 64.8% solution | — | 1.19 |
| Surfactant, 50% | 0.21 | 0.21 |
|  | 4.20 | 4.20 |
| Catalyst | 1.01 | 1.01 |

The crosslinking agent was a 43% buffered solution of 4,5-dihydroxy-1,3-dimethylolethyleneurea (Protocol C, marketed by Proctor Chemical Company). The catalyst was a 50% solution of zinc nitrate.

Samples of cotton cloth were treated with the above formulations and were dried for 90 seconds at 270° F. They were then cured by heating at 350° F. for 60, 120 and 240 seconds, respectively. The free formaldehyde residue on the cloth was then determined. The results were as follows.

| Cure Time | Formaldehyde A | Formaldehyde B | Formaldehyde Reduction |
| --- | --- | --- | --- |
| 60 seconds | 950 ppm | 300 ppm | 68.4% |
| 120 seconds | 900 ppm | 290 ppm | 64.2% |
| 240 seconds | 800 ppm | 260 ppm | 67.4% |

EXAMPLE 14

The experiment of Example 13 was repeated in all essential details except that the concentration of crosslinking agent was doubled, giving the following formulations.

|  | A | B |
| --- | --- | --- |
| Water | 26.50 lb | 27.68 lb |
| Crosslinking agent, 43% | 10.08 | 6.52 |
| NMP, 64.8% | — | 2.38 |
| Surfactant, 50% | 0.21 | 0.21 |
|  | 4.20 | 4.20 |

-continued

|  | A | B |
| --- | --- | --- |
| Catalyst | 1.01 | 1.01 |

The residual formaldehyde remaining on the cloth after curing was as follows.

| Cure Time | Formaldehyde A | Formaldehyde B | Formaldehyde Reduction |
| --- | --- | --- | --- |
| 60 seconds | 2820 ppm | 1285 ppm | 54% |
| 120 seconds | 2646 ppm | 1145 ppm | 56% |
| 240 seconds | 2228 ppm | 1000 ppm | 55% |

EXAMPLE 16

3,6-Dinitrooctane-4,5-diol (hereinafter designated as P-2316) was prepared by the following procedure.

Potassium hydroxide 129 g was dissolved in 120 g of water and the solution was chilled in an ice bath. A 145 g portion of a 40% solution was similarly chilled in an ice bath. 2-Nitropropane, 700 ml, was diluted with 700 ml of methanol and chilled in an ice bath. These three components were then slowly mixed over a period of 10–15 minutes while keeping the mixture chilled in an ice bath. Mixing was continued for an hour, then 500 ml of water was added. The pH was adjusted to 7.0 using $SO_2$ and the mixture was allowed to stand. It separated into two layers. The upper layer was isolated. It had a pH of 8.1 which was adjusted to 7.0 using 2% sulfuric acid. Solvent was removed by evaporation.

Two solutions for contributing wrinkle resistance to cotton cloth were prepared as follows:

|  | A | B |
| --- | --- | --- |
| Hylite LF* | 20.0 g | 20.0 g |
| Amine hydrochloride CNC** | 3.0 | 3.0 |
| P-2316 | 2.0 | — |
| Methanol | 73.0 | 75.0 |

*1,3-dimethylol-4,5-dihydroxyimidazoline marketed by Proctor Chemical Company
**Marketed by CNC Chemical Corporation.

Samples of cotton fabric were treated with these solutions as described in Example 1. They were then dried at 105° C. for 2 minutes and cured at 177° C. for another two minutes. The properties were as follows.

|  | A | B |
| --- | --- | --- |
| Recovery angle | 304 | 309 |
| Tensile strength, F | 34.6 psi | 36.0 psi |
| W | 16.8 | 18.0 |
| Residual HCHO, ppm | 572.39 | 801.7 |

The dinitrodiol resulted in a reduction of 28.6% of residual formaldehyde on the cloth.

EXAMPLE 16

The experiment of Example 15 is repeated in all essential details except that 2,5-dinitrohexane-3,4-diol is substituted for P-2316. The reduction in residual formaldehyde is significant.

EXAMPLE 17

The experiment of Example 15 is repeated in all essential details except that 2,5-dimethyl-2,5-dinitro-3,4- hexanediol is substituted for P-2316. The reduction in residual formaldehyde is significant.

EXAMPLE 18

The experiment of Example 15 is repeated in all essential details except that 1,4-dinitro-2,3-butanediol is substituted for P-2316. The reduction in residual formaldehyde is significant.

EXAMPLE 19

A supply of wood chips (known as "furnish") used for making particle board was obtained from a particle board manufacturer. It was thoroughly mixed with 6% of urea-formaldehyde resin of the type usually used for particle board manufacture. There was then added an acidic catalyst (6%, based on the resin, of an aqueous 20% ammonium sulfate solution) and 15% of 2-nitro-2-methylpropanol (NMP) based on the amount of resin. The NMP was dissolved in a sufficient amount of water to give a 60% solution before adding to the furnish-resin mixture.

The mixture was then packed into molds and placed in a press for varying periods of time at 320° F., thereby preparing a series of particle boards. Also a number of controls were run without NMP. The particle board specimens were then placed in storage at 72° F. and 65% relative humidity and were checked for residual formaldehyde at 18, 25 and 46 days respectively. The residual formaldehyde values are give in the table.

EXAMPLE 20

The experiment of Example 19 was repeated in all essential details except that a low-fuming urea-formaldehyde resin was used. The residual formaldehyde values are given in the table.

| | | Residual Formaldehyde in Particle Board | | | | | |
|---|---|---|---|---|---|---|---|
| | | Low Fuming Resin | | | Regular Resin | | |
| | Time, Min. | 18 Days ppm | 25 Days ppm | 46 Days ppm | 18 Days ppm | 25 Days ppm | 46 Days ppm |
| 15% NMP | 3:45 | 1.3 | 1.2 | 0.6 | 2.3 | 2.5 | 1.0 |
| | 3:30 | 1.2 | 1.0 | 0.6 | 2.8 | 2.0 | 0.7 |
| | 3:15 | 1.8 | 1.4 | 0.7 | 2.0 | 2.2 | 1.2 |
| | 2:55 | 1.8 | 1.4 | 0.7 | 2.0. | 2.2 | 1.2 |
| Control | 3:45 | 1.4 | 1.6 | 0.8 | 3.0 | 2.7 | 1.2 |
| | 3 30 | 1.0 | 1.4 | 0.9 | 3.0 | 3.2 | 1.4 |
| | 3:15 | 1.3 | 1.5 | 0.8 | | 3.1 | 1.4 |
| | 2:55 | 1.5 | 1.6 | 0.8 | 3.0 | 2.9 | 1.3 |

EXAMPLE 21

The experiment of Example 20 was repeated in all essential details with the following exceptions. The furnish was a blend of Southern pine and hardwood and the resin was a low-fuming urea-formaldehyde obtained from Georgie Pacific Company. The board was formed at 375° F. A 20% aqueous solution of ammonium chloride, 4% based on the resin solids, was used as a catalyst. It was mixed with the resin along with 8% (based on resin) of a 60% aqueous solution of NMP. The resulting mixture, which had a pH under 7, was sprayed onto the furnish which was then packed into a mold and heated at 375° F. until the resin cured. The particle board so prepared was placed in storage at 72° F. and 65% relative humidity for 24 hours and the residual formaldehyde was then determined. A control sample without NMP was run alongside. The results showed 71 ppm of formaldehyde in the control and 41 ppm in the sample treated with NMP.

EXAMPLE 22

The experiment of Example 21 was repeated in all essential details except 6.6% of ammonium chloride was used as the catalyst and the amount of NMP was increased to 13%. The resin was obtained from Reichhold Chemicals, Inc. and the furnish was hardwood. The control board showed 129 ppm and the board treated with NMP showed 91 ppm.

I claim:

1. A composition adapted to treating textiles and non-woven cellulosic products comprising a mixture of a cross-linking agent and a nitroalkanol in an amount of from about 18 to about 142 parts per 100 parts by weight of the cross-linking agent, said nitroalkanol being represented by the formula:

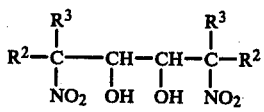

where $R^2$ can be hydrogen, methyl or ethyl and $R^3$ can be hydrogen or methyl; $R^2$ and $R^3$ can be the same or different.

2. A composition adapted to treating textiles and non-woven cellulosic products comprising a mixture of a curable methylol terminated resin and a nitroalkanol in an amount of from about 0.25 to about 3.0 moles per mole of resin, said nitroalkanol being represented by the formula:

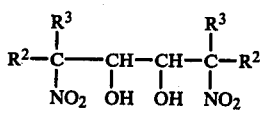

where $R^2$ can be hydrogen, methyl or ethyl and $R^3$ can be hydrogen or methyl; $R^2$ and $R^3$ can be the same or different.

3. The composition of claim 1 wherein the nitroalkanol is 3,6-dinitrooctane-4,5-diol.

4. The composition of claim 1 wherein the nitroalkanol is 2,5-dinitrohexane-3,4-diol.

5. The composition of claim 1 wherein nitroalkanol is 2,5-dimethyl-2,5-dinitro-3,4-hexane diol.

6. The composition of claim 1 wherein the nitroalkanol is 1,4-dinitro-2,3-butanediol.

7. A method of reducing the residual formaldehyde content of a wrinkle-resistant fabric by impregnating the fabric with the composition of claim 1 and an acidic catalyst therefor and heating to 225° to 400° F. to effect a cure of the resin.

8. A wrinkle-resistant fabric obtained by impregnating the fabric with the composition of claim 1 and an acidic catalyst therefor and heating to 225° F. to 400° F.

9. The method of claim 7 wherein the fabric is a woven textile of wool or cotton.

10. The method of claim 7 wherein the fabric is a non-woven fabric of cellulose fibers.

11. A woven fabric of claim 8 made of wool or cotton.

12. A non-woven fabric of claim 8 made from cellulose fibers.

13. The composition of claim 1 wherein the crosslinking agent is a member selected from the group consisting of phenol formaldehyde, substituted phenol formaldehyde, melamines, methylol-containing acrylics, furfuryl alcohol-formaldehyde, urea furfuryl alcohol-formaldehyde, phenol/furfuryl alchol-formaldehyde, phenol/urea/furfuryl alcohol-formaldehyde, urea/phenolformaldehyde and mixtures thereof.

14. The composition of claim 1 wherein the crosslinking agent is a carbamate.

15. The composition of claim 1 wherein the crosslinking agent is a modified melamine.

16. The composition of claim 1 wherein the crosslinking agent is an ethylene urea.

17. The composition of claim 1 wherein the crosslinking agent is a triazone.

18. A method for reducing residual formaldehyde in an artificial board prepared by heating in a press a mixture of cellulosic material, a methylol terminated resin and an acid catalyst therefor comprising the step of incorporating in the mixture a nitroalkanol in an amount of from 18 to about 142 parts per 100 parts by weight of the resin, said nitroalkanol being represented by the formula:

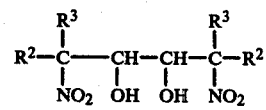

where $R^2$ can be hydrogen, methyl or ethyl and $R^3$ can be hydrogen or methyl; $R^2$ and $R^3$ can be the same or different, or a mixture thereof.

* * * * *